United States Patent [19]

Henderson, Jr.

[11] Patent Number: 4,677,670

[45] Date of Patent: Jun. 30, 1987

[54] PAIRED-SECURE MESSAGE IDENTIFICATION CONTROLLER FOR COMPUTERS AND THE LIKE

[76] Inventor: Paul B. Henderson, Jr., Box 4589, 525 Spencer Way, Incline Village, Nev. 89450

[21] Appl. No.: 750,739

[22] Filed: Jul. 1, 1985

[51] Int. Cl.$^4$ ............................................... H04K 1/02
[52] U.S. Cl. ......................................... 380/23; 380/25; 380/44
[58] Field of Search ............... 178/22.08, 22.09, 22.14; 380/23, 25, 44

[56] References Cited

U.S. PATENT DOCUMENTS

| | | | |
|---|---|---|---|
| 4,193,131 | 3/1980 | Lennon et al. | 178/22.09 |
| 4,223,403 | 9/1980 | Konheim et al. | 178/22.08 |
| 4,326,098 | 4/1982 | Bouricius et al. | 178/22.09 |
| 4,429,180 | 1/1984 | Unkenholz | 178/22.14 |
| 4,493,028 | 1/1985 | Heath | 178/22.09 |

Primary Examiner—Salvatore Cangialosi
Attorney, Agent, or Firm—Richard L. Miller

[57] ABSTRACT

A paired-secure message identification controller for computers and the like is provided which yields secure communications between two computers with the invention installed. The message originator provides a guest identification module to the recipient which matches the originator's host identification module. If return messages are to be sent another set of modules is provided by the recipient. Before a message is transmitted from the originator to the recipient a pre-validation check is first performed. Once the validation is received the message is authenticated and/or encrypted, transmitted, reauthenticated, and/or decrypted, and verified for accuracy. The control codes, message, date, time and any error messages are permanently stored.

6 Claims, 8 Drawing Figures

PAIRED-SECURE MESSAGE IDENTIFICATION CONTROLLER FOR COMPUTERS AND THE LIKE

BACKGROUND OF THE INVENTION

The present invention relates generally to the field of telecommunications systems for the transmission of data, and, more specifically to those systems which assure privacy and integrity of communications by providing for verification of the identity of the sender and/or the receiver, authentication of the message and encrypting/decrypting of the message content.

The use of computers and telecommunications networks to deliver messages containing critical data and value-related transfers is restrained by uncertainty of the identity of the party at the other end of the connection and by uncertainty of the integrity of the message content.

A limited degree of certainty and integrity is attained by controlling the physical attributes of the network and the handling of the message; by restricting the number of participants in a network, by limiting the devices and communication lines that can be used, by requiring special access features such as plastic cards and by prescribing the message format to be employed.

Another alternative is to control the message itself; to transform the message so that it is intelligible only to the intended party or to express it in a private language.

Both solutions depend on isolating each network from all others. Many networks have been established using one or both of these solutions. They are successful in serving specific groups of users for particular purposes. They are not suitable as a foundation for universal electronic transaction services. Further, since proprietary systems and encrypted messages forego economies of scale to attain the isolation that permits control they are too expensive to serve the great number of critical-data and value-related messages now processed through paper-based systems. The most important example is found in banking where 40 billion paper checks are processed each year.

SUMMARY OF THE INVENTION

It is, therefore, a primary object of the present invention to provide a paired-secure message identification controller for computers and the like which eliminates the uncertainty about the identity of the other party in an electronic transaction. The uncertainty about the identity of the party at the other end of the communication channel is resolved by placing at the recipient's site one member of a pair of devices, both of which are under the control of the originator.

A further object is to provide a paired-secure message identification controller for computers and the like which eliminates the uncertainty about the content of the message. The paired devices resolve the uncertainty about the integrity of the communication by providing dual authentication of the message and by accommodating encrypting/decrypting of the content.

A still further object is to provide a paired-secure message identification controller for computers and the like which eliminates the uncertainty about the fact and timing of the delivery. The paired devices resolve the uncertainty of the integrity and timing of the message by providing paired records of the message and/or of the identity of the originator and recipient.

A yet still further object is to provide a paired-secure message identification controller for computers and the like which is compatible with existing computers and telecommunications processors, and with existing authentication & encrypting schemes, and additionally permits each user to establish controlled communication over any available communication channel with any desired number of other parties at moderate cost.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
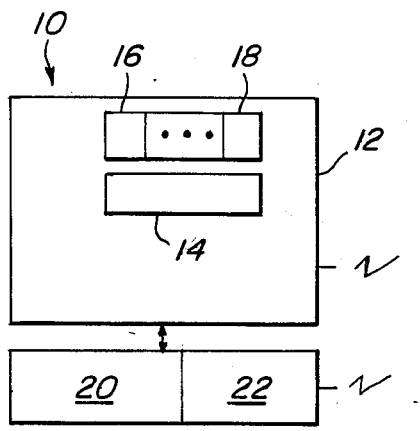
FIG. 1 is a diagrammatic view illustrating a control processor, with blocks removed for clarity, connected to a computer and a telecommunications processor. The jagged lines emphasize that two data links are present.

As illustrated in FIG. 1, the paired-secure message identification controller 10 consists of a control processor 12 containing a host identification module 14, and one or more guest identification modules typified by 16 and 18. The controller 10 is associated with a computer 20, which can range in size from a portable computer to a large mainframe central processor, and a telecommunications processor 22.

Figure 2:
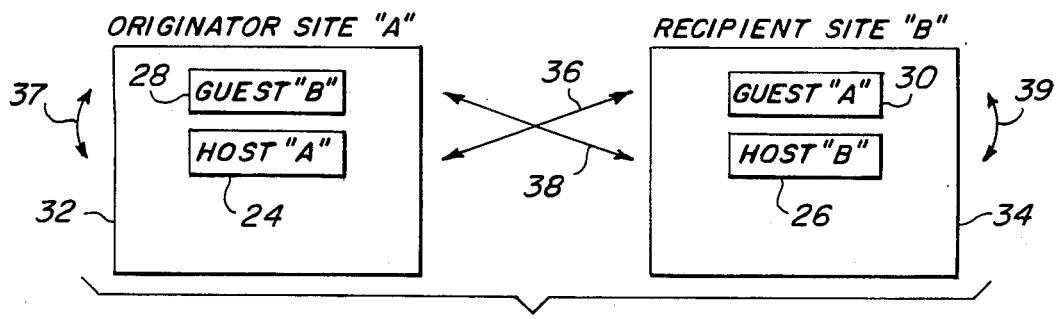
FIG. 2 is a diagrammatic view illustrating two control processors communicating with each other.

The placement of identification modules may best be understood with reference to FIG. 2. The originator's site is called site "A" while the recipient's site is called site "B". For each site, there exists a host identification module, such as Host "A", numeral 24 at site A and Host "B", numeral 26 at site B. There also exists one guest identification module for each remote site with which communications is to take place, such as Guest "B", numeral 28 at site A and Guest "A", numeral 30 at site B. Each of the control processors, 32 and 34, can accept as many guest modules as needed.

The transfer of control from one party to another, Host "A" to Guest "B" or Host "B" to Guest "A", is effected locally between a host identification module and a paired guest identification module, within a single control processor using data link 37 at site A and date link 39 at site B.

The transfer of location from one site to another, Host "A" at site A to Guest A at site B or Host "B" at site B to Guest "B" at site A, is effected over any distance by both ends of the data link, numeral 36 for "A" and numeral 38 for "B", are controlled by the same party.

Figure 3:
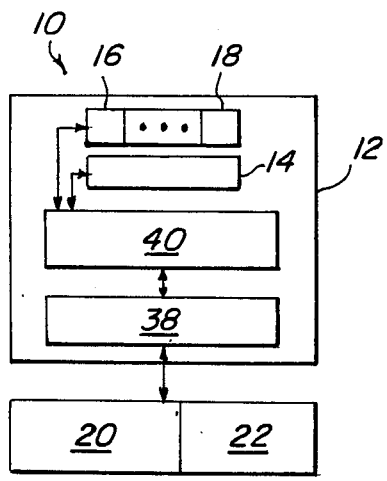
FIG. 3 is a diagrammatic view illustrating the components of the control processor including identification modules, universal interface and a custom interface.

Additional details of control processor 12 may be seen in FIG. 3. The control processor 12 includes custom interfaces 38, as appropriate to computer 20 and telecommunications processor 22; and a universal interface 40 that enables communication between host and guest identification modules, typified by 14, 16 and 18, whether at the same site or resident at other sites.

Figure 5:
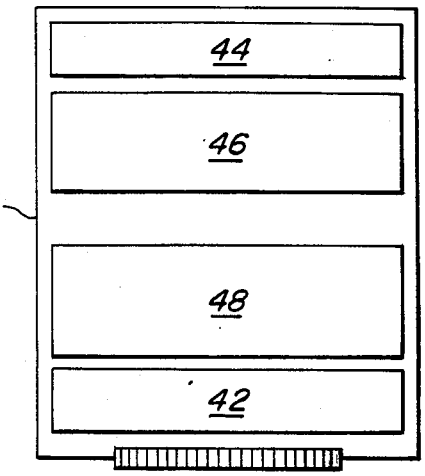
FIG. 5 is a plan view of a plug-in identification module similar to the diagrammatic view of FIG. 4.
Figure 4:
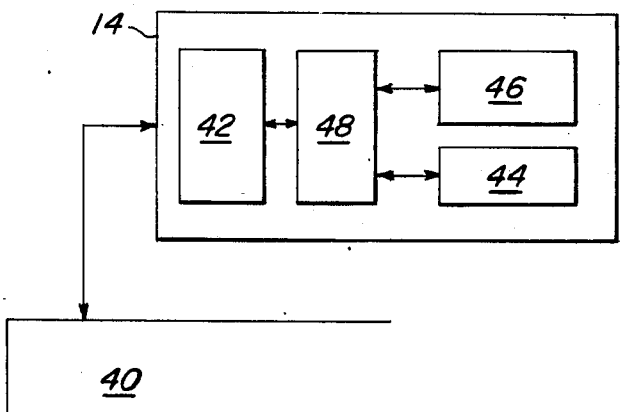
FIG. 4 is a diagrammatic view of a typical host or guest identification module with on-board microprocessor.

Details of the guest and host identification modules may best be understood with reference to block diagram FIG. 4 and FIG. 5, which is a view of a printed-circuit board implementation of this circuit. Since both host and guest modules are functionally similar, host module 14 will be considered. Host module 14 includes control circuitry 42 to process signals to and from the universal interface 40, security cells 44, and message record cells 46. Each identification module is equipped with an on-board micro-processor 48 with built-in read-only-memory (ROM).

The security cells 44, permit the controlling party to control the activation and disabling of the identification module 14 and to establish multiple levels of security by the insertion of cells containing processing sequences, encrypting/decrypting keys, authentication algorithms and random number generators.

The message record cells 46 provide a permanent record of each transaction by storing selected reference codes, and/or the message, and/or the identity codes for the sender or receiver as defined by the security cells 44 to provide different levels of security. Separate logs are recorded in each of the identification modules that are paired in a transaction thereby assuring the means to resolve all questions about a message and its processing.

Figure 6:
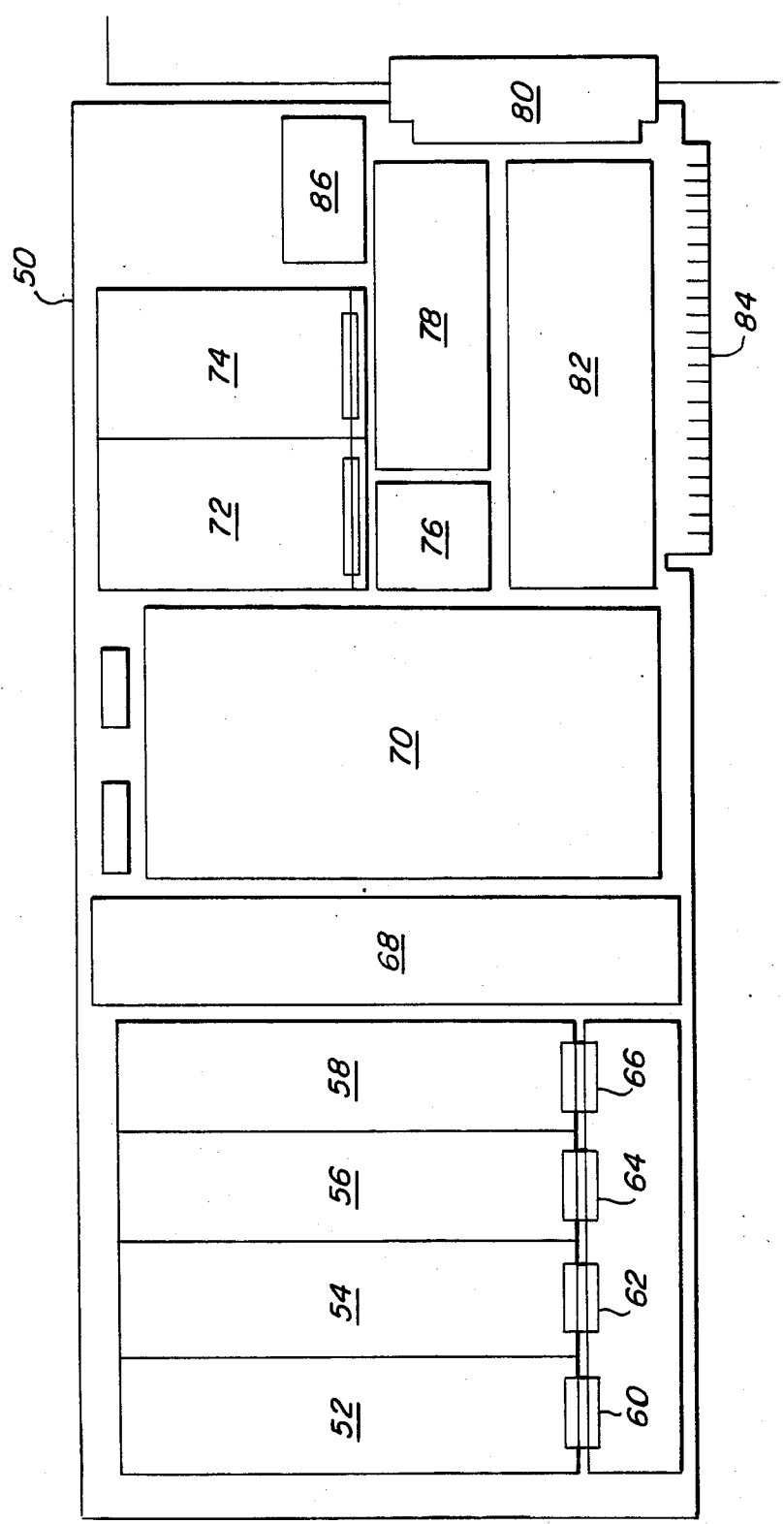
FIG. 6 is a plan view of a typical control processor board.

The entire control processor 50, with plug-in identification modules may best be understood with reference to FIG. 6 which illustrates the type of board which might plug into an option slot on such personal computers as the IBM PC, PC/XT or PC/AT. On the left, four guest module sockets, 52, 54, 56 and 58 are provided along with their respective connectors 60, 62, 64 and 66. A buffer memory 68, typically a random-access-memory (RAM) provides volatile storage. Control circuitry 70 is provided as previously explained. Two host module are provided, 72 for local guests, and 74 for remote guests. Timing and date information is provided by clock/calendar 76. An asynchronous communications interface 78 feeding a serial interface connector 80 provides a standard interface, such as RS232, for connection to a modem. A custom interface 82 matches the controller board 50 to the host computer via an edge-connector 84. A modular expansion connector 86 permits stacking of boards to increase the number of guests accommodated. While a particular personal computer based system is shown, it is understood that other configurations for various personal computers, mini-computers and mainframe computers could be built without departing from the spirit of the invention.

The configuration illustrated in FIG. 6 is readily attainable at the present state-of-the-art. Typical parts might include: microprocessor for guest/host modules: INTEL 8048 with 2K ROM. Custom interface: LS245 octal transceivers for control bus buffers and data bus buffers, LS244 octal address bus buffer, LS374 octal flip-flop for bus direction and enable, and for data latch, LS373 octal latches for I/O address decoder. Asynchronous communications interface: LS245 control, 8250 serializer/deserializer (SERDES). Clock and calendar: 8255. Control circuitry: INTEL 8048 microprocessor with 2K ROM, LS244, LS245 and LS373 buffers, latches and decoders, LS158, LS245, LS373 memory support logic. "LS" numbers refer to low-power-Schottky, transistor to transistor logic integrated circuits and the 8000 series numbers are Intel numbers for large scale integrated circuits. On the identification modules, the security cells are 8 bit ROMs. The non-volatile memory for the message record is implemented in standard bubble-memory arrays or on magnetic media.

Figure 7A:
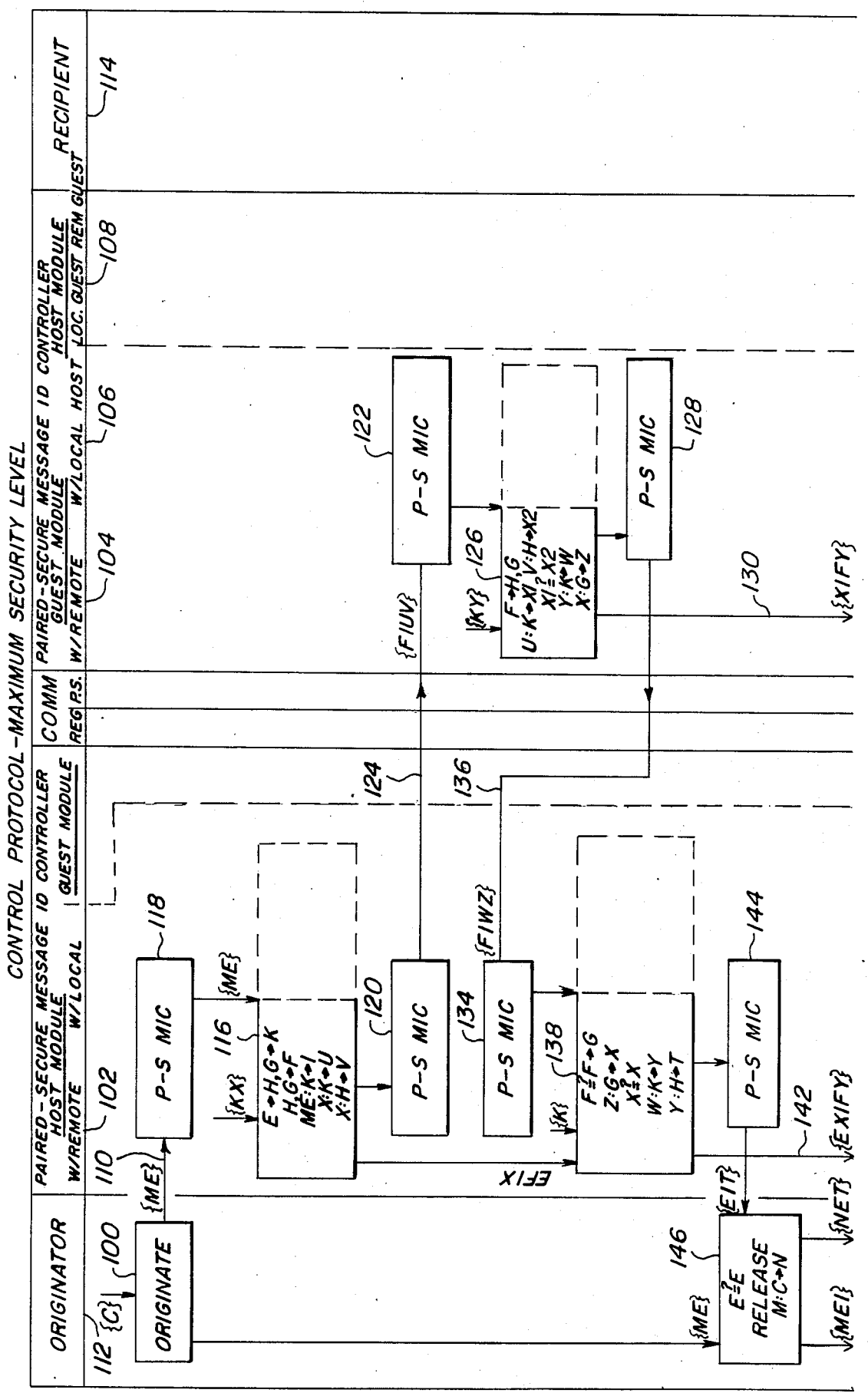
FIGS. 7A and 7B is a protocol flow chart, at maximum security level, illustrating how the various components cooperate with each other.
Figure 7B:
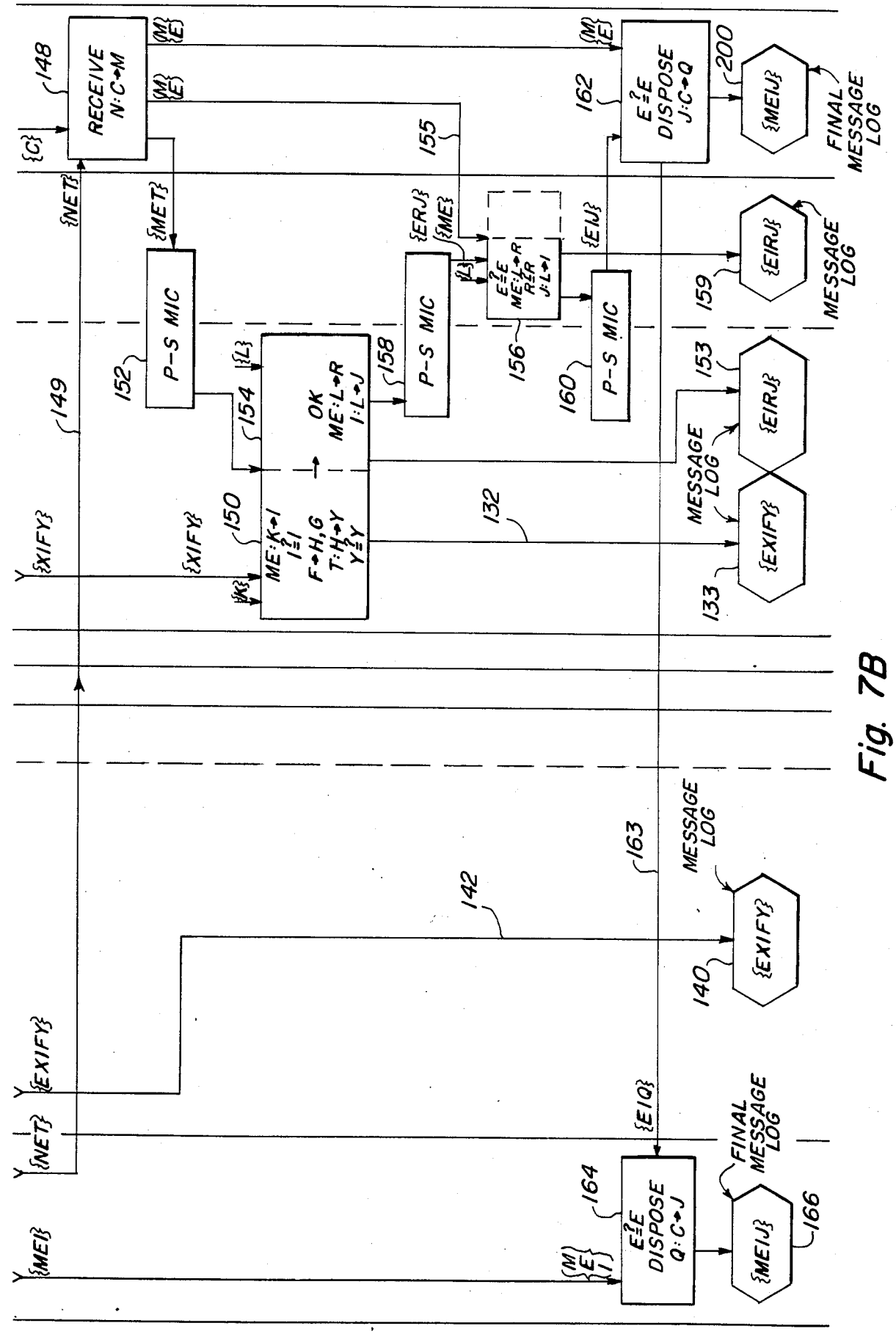

The complex process of cross-verifying the identities of a sender and a remote recipient, encrypting and decrypting a message and logging all transactions when maximum security levels are used may best be understood with reference to FIGS. 7A,B. It must be understood that the purpose of the invention is to transmit a message from origination at 100 to the final message log at 200 with accuracy and integrity.

To better understand this protocol flow chart the headings should first be examined from left to right. "Originator" refers to the originator's computer into which the controller board has been inserted. "Paired-secure message ID (identification) controller" refers to the board which has been plugged into the originators computer. Herein it will be referred to as the originator's P-S MIC. This originator's P-S MIC has host module "A" plugged into it which contains a series of identity codes, coding keys and algorithms. For two-way communication, a guest module is also inserted, but for the sake of clarity one-way communications is illustrated, from originator to recipient. "COMM" represents the communications links between originator and recipient. "P.S." represents the data pathway used for paired-secured pre-verification, before the actual message is transmitted and "REG" represents the regular data pathway used for transmission of the actual message itself. Similarly, at the recipient's site, the recipient's "paired-secure message ID controller" (recipient's P-S MIC) has both guest and host modules installed, since both are necessary to receive messages. "Recipient" refers to the computer into which the recipient's P-S MIC is installed and on which the final message will be displayed and stored along with the final message log and any error messages. Within each column, one item of hardware, e.g. the recipient's P-S MIC, is given a succession of numerals i.e. 122, 128, 152, 158, 160 to clarify the flow of data and control signals. Similarly a module, e.g. the guest module in the recipient's P-S MIC, is given a sequence of numerals i.e. 126, 150, 154 to clarify the different processes that occur within the security of the sealed module.

The originator and recipient maintain a common code {C} of whatever structure and degree of sophistication is mutually agreeable. If plain-language transmission is desired, {C} is an identity transformation.

The originator's host identification module 102 and its remote guest identification module 104 maintain a unique common key {K} in their security cells, hold secret identity codes of the host {H} and guest {G} and have separate random number generators {X} and {Y}. The recipient's host identification module 106 and its local guest identification module 108 maintain a common key {L}.

The originator 112 originates 100 the message {M} and its envelope {E} and sends them via data pathway 110 to the originator P-S MIC 118. The envelope includes the names and addresses of the originator 112 and recipient 114, a serial number of the message and the date and time.

The host identification module 116 in the originator's P-S MIC 118, upon receipt of {M} and {E}, determines {H} and {G} from the participants named in the envelope, retrieves the key {K} appropriate to the {H}{G} pair, generates a random number {X} and generates {U} a transform of {X} based on {K} and {V} a transform of {X} based on {H}. The envelope {E} is modified to become {F} with a serial number based on traffic between the host/guest module pair. An identification code {I} is generated from {M} and {E} based on {K}. The originator's P-S MIC 120 sends variables {F}{I} {U} and {V} to the recipient's P-S MIC 122 via data pathway 124 using the paired-secured communication pathway indicated by the arrow.

The originator's guest identification module 126 in the recipient's P-S MIC 122 identifies {H} and {G} from the addresses in {F} and extracts {X1} from {U} using {K} and {X2} from {V} using {H}. If {X1}={X2}, the identity of the sender {H} is verified. If not verified, error procedures are followed to advise non-acceptance and the values of {XIF} are stored via pathways 130 and 132. With acceptance, a new random number {Y} is generated and a new pair of recognition codes is prepared using {K} to obtain a pre-verification code {W} and using {G} to obtain {Z}. The recipient's P-S MIC 128 transmits acceptance using variables {FIWZ} to the originator's P-S MIC 134 via pathway 136.

The host identification module 138 in the originator's P-S MIC 134 matches records based on {F}, then determines {G} based on {F} and extracts {X} from {Z}. If {X} is consistent with {G} the identity of {G} is confirmed along with the assurance that {G} has confirmed the identity of {H}. If rejected, error procedures are followed to advise nonacceptance and the values {XIF} are stored via pathway 142. With acceptance, {Y} is extracted from the pre-verification code {W} using {K} and {T} is generated from {Y} using {H} as the recognition code for the message. The originator's P-S MIC 144 transmits variables {EIT} to the originator's computer 146.

The originator's computer 146 matches records based on {E}, transforms the message {M} based on {C} into {N} and releases it to the recipient's computer 148 via pathway 149 with {T} and the original envelope {E}.

The recipient's computer 148, upon receipt of {N}, extracts {M}, based on {C} as determined from the identity of the sender included in {E}. The originator's guest identification module 150 in the recipient's P-S MIC 152 identifies the originator {H} from {E}, retrieves {K} and generates {I} from {ME}, given {K} and matches on {I}. If {I} as-generated matches {I} as-received the content of the message is confirmed. Then {Y} is extracted from {T} on the basis of {H} and {G} represented in {F}. The match of {Y} confirms the pre-verification provided earlier in {W}. If there is no match an error message with {EIXF} is stored at 133 via data 132. If the match is confirmed, the local host side 154 of the originator's guest identification module 150 generates {R} from {M} and {E}, given {L}, generates {J} from {I} given {L}, and stores {EIRJ} in 153.

The recipient's host identification module 156, located in recipient's P-S MIC 158 receives {E}, {J} and {R} from its pair, the originator's guest identification module 154, matches on {E} the record received from the recipient's computer 148 via data link 155, generates {R} from {M} and {E}, given the key {L}, and verifies that {R} as-received matches {R} as-generated. If there is no verification, error message {ERJ} is reported at 159. If verified, {I} is extracted from {J}, given {L} and acceptance is reported by the recipient's P-S MIC 160 to the recipient's computer 162.

The recipient's computer 162 matches records on {E} and generates {Q} from {J}, given {C}. Upon advise via data link 163, the originator's computer 164 repeats the exact same matching and extracts {J} from {Q} given {C}. The final message logs of the originator's computer 166 and the recipient's computer 200 are identical. The message logs of the originator's host module 140 and originator's guest module 128 are identical and the originator's guest module 153 and the recipient's host module 159 are identical. Error messages in each pair record rejection events.

The above example represents an exposition of a large number of capacities of the controller. A subset of these capacities may be selected and the order in which they occur may be varied without departing from the spirit of the invention.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. Secure message identification controller for computers and the like, comprising in combination:
    (a) a paired-secure message identification controller locatable at an originator site and a similar paired-secure message identification controller locatable at a recipient site, which herein are referred to as site A and site B respectively; whereas each of said paired-secure message identification controllers are associated with a computer and a telecommunications processor;
    (b) a host identification module locatable at site A and supplied by site A; a host identification module locatable at site B and supplied by site B; a guest identification module locatable at site A and supplied by site B; and a guest identification module locatable at site B and supplied by site A; each of said identification modules being contained within said controllers; and
    (c) a data link at each site for communicating between the host module and guest module at the site to provide a unique security key to the message at the host site which is unique for that specific guest site and for decoding with a matching key at the guest site for that specific host, such that the initiation of secured communications of a message is assure by the matching keys unique to each pair of said identification modules, some of which have been transformed according to alogrithms contained in said identification modules.

2. Secure message identification controller for computers and the like, as recited in claim 1, wherein said message is represented in authentication codes generated by said algorithms contained in said host module at site A for transmission from site A to site B and is matched by authentication codes generated independently, by algorithms contained in said guest module at site B using the pair of unique keys.

3. Secure message identification controller for computers and the like, as recited in claim 1, wherein said message is itself encrypted by said algorithms contained in said host module at site A for transmission from site A to site B and is decrypted at site B by algorithms contained in said guest module at site B.

4. Secure message identification controller for computers and the like, as recited in claim 1, wherein said paired-secure message identification controllers further comprise custom interfaces as appropriate to said computer and said telecommunications processor; and, a universal interface that enables communication with said host and said guest identification modules whether at the same site or resident at other sites.

5. Secure message identification controller for computers and the like, as recited in claim 4, wherein said host identification module and said guest identification module further comprise: control circuitry to process signals to and from said processor and universal interface; security cells which permit a controlling party to control the activation and disabling of said identification module and to establish multiple levels of security by the insertion of cells containing processing sequences, encrypting/decrypting keys and authentication algorithms and cells for generating random numbers; message record cells which provide a permanent record of each transaction by storing said message, selected reference codes and identity codes of said originator and said recipient as defined by said security cells; and, an on-board microprocessor to execute the algorithms and control data flow.

6. Secure message identification controller for computers and the like, as recited in claim 5, wherein a maximum-security-level control protocol utilizing said host and guest identification modules may proceed, typically, as follows:

(a) means at said originator and said recipient for maintaining a common code {C} of whatever structure and degree of sophistication is mutually agreeable;

(b) said originator's host identification module at site A and its remote said remote guest identification module at site B maintain a unique common key {K} in their security cells, hold secret identity codes of said host {H} and said guest {G} and have separate random number generators {X} and {Y} respectively; wherein said recipient's host identification module and its said guest identification module maintain a common key {L};

(c) said originator prepares a message {M} and its envelope {E} wherein said envelope contains the names and addresses of said originator and said recipient, a serial number of said message and a date and time;

(d) said host identification module in said originator's paired-secure message identification controller, upon receipt of {M} and {E}, determines {H} and {G} from the participants named in said envelope, determines a key {K}, generates a random number {X} and generates {U} and {V} as transforms of {X} based on {K} and on {H} respectively and said envelope {E} is modified to become {F} with a serial number based on traffic between said host-guest pair and an identification code {I} is generated from {M} and {E} based on {K};

(e) said originator's guest identification module in said recipient's paired-secure message identification controller identifies {H} and {G} from said addresses in {F} and extracts {X1} from {U} using {K} and {X2} from {V} using {H}; if {X1}={X2}, the identity of {H} is verified; if not, errors are reported out to advise participants of rejection; while, with acceptance, a new random number {Y} is generated and a new pair of recognition codes is prepared using {K} and {Y} to obtain {W} and using {G} and {X} to obtain {Z};

(f) said host identification module in said originator's paired-secure message identification controller matches records based on {F}, then determines {G} based on {F} and extracts {X} from {Z}; whereas, if G is consistent with {X} the identity of {G} is confirmed along with the assurance that {G} has confirmed the identity of {H}; if not, errors are reported out to advise participants of rejection; while, with acceptance, {Y} is extracted from {W} and {K}, and {T} is generated from {Y} and {H} as the recognition code for the message;

(g) said originator matches records based on {E}, transforms said message {M} based on {C} into {N} and releases it with {T} and the original envelope {E};

(h) said recipient, upon receipt of {N}, extracts {M}, based on {C} as determined from said identity of said sender included in {E};

(i) said originator's guest identification module in said recipient's paired-secure message identification controller identifies said originator {H} from {E}, extracts {I} from {ME} given {K} and matches on {I}; whereby if {I} as generated matches {I} as-received the content of said message is confirmed; next, {Y} is extracted from {T} on the basis of {H} and {G} represented in {F}; while, the match of {Y} confirms the pre-verification provided earlier in {W}; if not confirmed, errors are reported to participants; and, the local host side of said originator's guest identification module generates {R} from {M} and {E} given {L} and generates {J} from {I} given {L};

(j) said recipient's host identification module receives {E}, {J} and {R} from said originator's guest identification module, matches the record received from said recipient on {E}, generates {R} from {M} and {E}, given the key {L} and verifies that {R} as-received matches {R} as generated; if not, errors are reported to participants; next, {I} is extracted from {J}, given {L} and said acceptance is reported to said recipient;

(k) said recipient matches records on {E} and, with confirmation of acceptance, transforms {J}, based on {C} into {Q} and advises said originator;

(l) said originator matches records on {E} and extracts {J} from {Q}, given {C}; and, (m) the message record logs of said originator's host identification module and its guest located with said recipient are identical; the message logs of said originator's guest identification module located with said recipient and said recipient's host identification module are identical; and, the final message logs of said originator and said recipient are identical.

* * * * *